United States Patent
Yao et al.

(10) Patent No.: US 10,723,229 B1
(45) Date of Patent: Jul. 28, 2020

(54) REGENERATIVE BRAKING CONTROL SYSTEM

(71) Applicant: Ford Global Technologies, LLC, Dearborn, MI (US)

(72) Inventors: Yixin Yao, Ann Arbor, MI (US); Yanan Zhao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/355,084

(22) Filed: Mar. 15, 2019

(51) Int. Cl.
| | |
|---|---|
| *H02P 3/14* | (2006.01) |
| *B60L 7/22* | (2006.01) |
| *B60T 8/32* | (2006.01) |
| *B60L 7/26* | (2006.01) |
| B60T 8/1761 | (2006.01) |
| B60T 13/58 | (2006.01) |
| H02P 3/08 | (2006.01) |
| B60W 10/188 | (2012.01) |
| B60W 10/196 | (2012.01) |
| B60W 10/08 | (2006.01) |

(52) U.S. Cl.
CPC .................. *B60L 7/22* (2013.01); *B60L 7/26* (2013.01); *B60T 8/3215* (2013.01); *B60T 8/1761* (2013.01); *B60T 13/585* (2013.01); *B60T 2270/602* (2013.01); *B60T 2270/603* (2013.01); *B60W 10/08* (2013.01); *B60W 10/188* (2013.01); *B60W 10/196* (2013.01); *H02P 3/08* (2013.01)

(58) Field of Classification Search
CPC ........... B60L 15/2009; B60L 7/26; B60L 7/18
See application file for complete search history.

(56) References Cited

U.S. PATENT DOCUMENTS

| | | | |
|---|---|---|---|
| 5,476,310 A | 12/1995 | Ohtsu et al. | |
| 5,615,933 A | 4/1997 | Kidston et al. | |
| 6,231,134 B1* | 5/2001 | Fukasawa | B60L 7/26 303/152 |
| 7,152,934 B2 | 12/2006 | Fuhrer et al. | |
| 9,193,339 B2 | 11/2015 | Yao et al. | |
| 2006/0138859 A1* | 6/2006 | Nakayama | B60T 8/1706 303/113.1 |
| 2016/0264111 A1 | 9/2016 | Doi et al. | |
| 2018/0264949 A1 | 9/2018 | Kaneko et al. | |

FOREIGN PATENT DOCUMENTS

JP          14079099 A      5/2014

OTHER PUBLICATIONS

Reif K. (Ed.), "Brakes, Brake Control and Advanced Driver Assistance Systems", Springer Verlag, 2014, 14 pages.

(Continued)

*Primary Examiner* — Karen Masih
(74) *Attorney, Agent, or Firm* — David Kelley; Brooks Kushman P.C.

(57) ABSTRACT

A vehicle includes an electric machine, friction brakes, and a controller. The electric machine is configured to recharge a battery during regenerative braking. The friction brakes are configured to apply torque to wheels of the vehicle to decelerate the vehicle. The controller is programmed to, responsive to an anti-lock braking event, adjust a regenerative braking torque of the electric machine based on a difference between a desired wheel slip ratio and an actual wheel slip ratio.

17 Claims, 11 Drawing Sheets

(56) References Cited

OTHER PUBLICATIONS

Wen-Po Chiang, et al., "Integrated Slip-Based Torque Control of Antilock Braking System for In-Wheel Motor Electric Vehicle", IEE Journal of Industry Applications, vol. 3, No. 4, pp. 318-327, 2014, 10 pages.

Dzmitry Savitski et al., "The New Paradigm of Anti-Lock Braking System for Full Electric Vehicle: Experimental Investigation and Benchmarking", Proceedings of the Institution of Mechanical Engineers Part D Journal of Automobile Engineering, Oct. 2015, 14 pages.

S. A. Oleksowicz et al., "Investigation of Regenerative and Anti-Lock Braking Interaction", International Journal of Automotive Technology, vol. 14, No. 4, pp. 641-650 (2013), 10 pages.

Oleksowicz, Selim, et al. "Regenerative braking control for high level deceleration on low mu surface." SAE International Journal of Alternative Powertrains 4.1 (2015): 209-224.

Oleksowicz, Selim, Keith Burnham, and Andrzej Gajek. "On the legal, safety and control aspects of regenerative braking in hybrid/electric vehicles." Czasopismo Techniczne. Mechanika 1093-M (2012): 139-155.

Ivanov, Valentin, et al. "Design and testing of ABS for electric vehicles with individually controlled on-board motor drives." SAE International Journal of Passenger Cars-Mechanical Systems 7.2014-01-9128 (2014): 902-913.

R. Kubaisi, "Adaptive Regenerative Braking in Electric Vehicles", Ph.D. Thesis, Karlsruher Institut für Technologie (KIT), Dec. 2018.

49 CFR Part 571 Part 571, 49 CFR 571.135—Standard No. 135; Light vehicle brake systems. Federal Motor Vehicle Safety Standards.

European Directive 71/320/EEC. Council Directive 2006/96/EC of 20, Nov. 2006, L 363 81.

ECE 13-H. Passenger cars with regards to braking. United Nations Rev.2/Add.12H/Amend. 4 of 6, Aug. 2007.

Oleksowicz, Selim, et al. "Legal, Safety and Practical Regenerative Braking Control Challenges." Measurement and Control 46.9 (2013): 283-288.

Khaleghian, Seyedmeysam, Anahita Emami, and Saied Taheri. "A technical survey on tire-road friction estimation." Friction 5.2 (2017): 123-146.

Oleksowicz, Selim A., et al. "Regenerative braking strategies, vehicle safety and stability control systems: critical use-case proposals." Vehicle System Dynamics 51.5 (2013): 684-699.

Fuentes, L.V., Regenerative Braking Systems, Universidad Pontificia Comillas ICAI-ICADE, May 2014.

\* cited by examiner

Simulation Test 1 - ABS Friction Brake Control without Regenerative Brake Torque (Right and Left Wheels with Same mu)

Simulation Test 2 - ABS Friction Brake Control with Regenerative Brake (Right and Left Wheels with Same mu)

Simulation Test 3 - ABS Friction Brake Control with Regenerative Brake Torque (Right and Left Wheels with Same mu)

Simulation Test 4 - ABS Friction Brake Control without Regenerative Brake (Right and Left Wheels with Same mu)

Simulation Test 7 - ABS Friction Brake Control without Regenerative Brake (Right and Left Wheels with Different mu)

REGENERATIVE BRAKING CONTROL SYSTEM

TECHNICAL FIELD

The present disclosure relates to hybrid/electric vehicles and methods of controlling regenerative braking in hybrid/electric vehicles.

BACKGROUND

Regenerative braking is a feature of hybrid vehicles that improves fuel economy by recapturing kinetic energy when the vehicle slows down during a braking event. During regenerative braking, an electric machine may operate as a generator to convert the kinetic energy of the vehicle into electrical energy which is in turn used to charge a battery.

SUMMARY

A vehicle includes an electric machine, friction brakes, and a controller. The electric machine is configured to recharge a battery during regenerative braking. The friction brakes are configured to apply torque to wheels of the vehicle to decelerate the vehicle. The controller is programmed to, responsive to an anti-lock braking event, adjust a regenerative braking torque of the electric machine based on a difference between a desired wheel slip ratio and an actual wheel slip ratio.

A vehicle includes an axle, a first electric machine, a second electric machine, a first friction brake, a second friction brake, and a controller. The axle has first and second wheels. The first and second electric machines are secured to the axle adjacent to the first and second wheels, respectively. The first and second electric machines are configured to transfer energy from the first and second wheels, respectively, to a battery during regenerative braking. The first and second friction brakes are configured to apply torque to the first and second wheels, respectively, to decelerate the vehicle. The controller is programmed to, responsive to an anti-lock braking event, adjust a regenerative braking torque of the first electric machine based on a difference between a desired wheel slip ratio and an actual wheel slip ratio of the first wheel.

A vehicle braking control method includes, responsive to an anti-lock braking event, adjusting a regenerative braking torque of an electric machine that is disposed on a wheel axle based on a difference between a desired wheel slip ratio and an actual wheel slip ratio, and adjusting a braking torque of a friction brake that is disposed on the wheel axle based on the difference.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
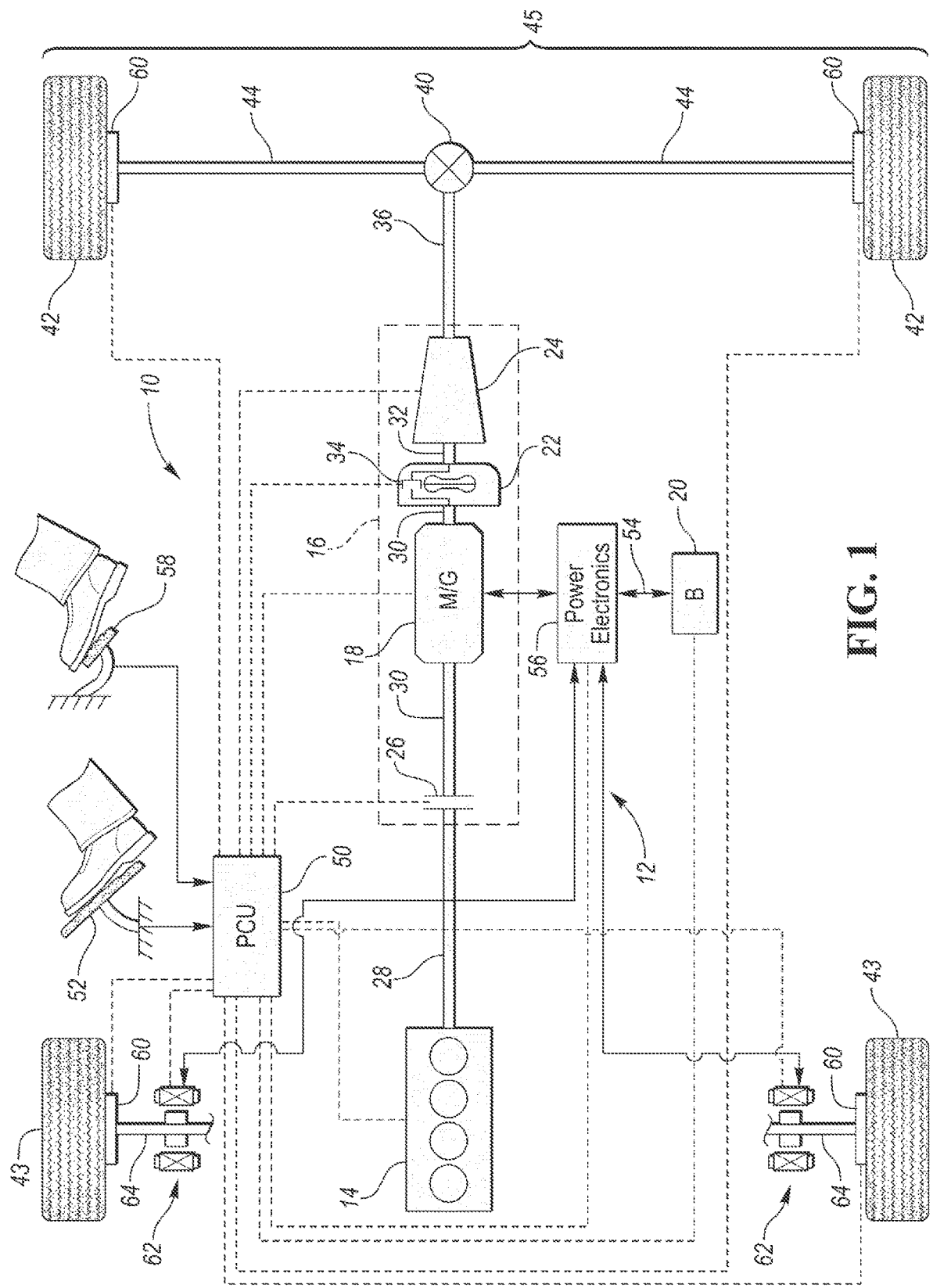
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of tires or drive wheels 42 via respective half shafts 44 that are connected to the differential 40. The drive wheels 42, half shafts 44, and differential 40 comprise the rear wheel axle 45 of the vehicle 10. The differential transmits approximately equal torque to each drive wheel 42 while permitting slight speed differences such as when the vehicle turns a corner. The vehicle 10 may include a second pair of tires or wheels 43. The pair of drive wheels 42 may be the rear wheels and the second pair of wheels 43 may be the front wheels. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The friction brakes 60 are secured to each of the wheels 42, 43 or to the respective hubs or shafts (e.g., half shafts 44) of each wheel. The friction brakes 60 are configured to apply torque to the wheels 42, 43 to decelerate the vehicle 10. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational energy or power from spinning drive wheels 42 is transferred back through the gearbox 24, torque converter 22, (and/or torque converter bypass clutch 34) and is converted into electrical energy for storage in the battery 20.

The vehicle 10 may also include an additional pair of motor/generators 62 that are secured to a front axle. More specifically, each of the pair of motor/generators 62 may be secured to one of a pair of half shafts 64 of the front axle, each half shaft 64 being secured to one of the front wheels 43. The half shafts 64, front wheels 43, and other additional components that are not shown (e.g., a differential) may comprise the front axle of the vehicle 10. Alternatively, each of the pair of motor/generators 62 may be secured to one of the half shafts 44 of the drive (or rear) wheels 42. The pair of motor/generators 62 may be configured to draw power from the battery 20 via the power electronics 56 to assist in propelling the vehicle 10 or may recharge the battery 56 via the power electronics 56 during regenerative braking. The pair of motor/generators 62 may be configured to operate at different power or torque levels while propelling the vehicle 10 or during regenerative braking in the event that the slip between each of the wheels 43 and the road surface (or other contact surface) is not the same. Each of the pair of motor/generators 62 may operate in any manner or be controlled via the controller 50 in any manner describe above with respect to M/G 18.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
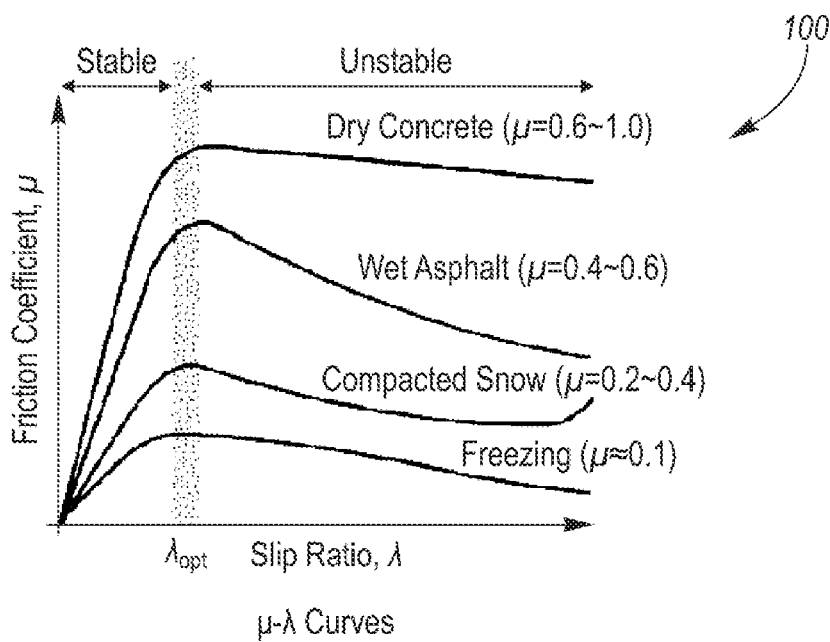
FIG. 2 is a graph that represents the relationship between the coefficient of friction between vehicle wheels and the road surface and the slip ratio of the vehicle.

Referring to FIG. 2, a graph 100 that represents the relationship between the coefficient of friction between the vehicle wheels and the road surface, μ, and the slip ratio of the vehicle, λ, under various road surfaces/conditions (e.g., dry concrete, wet asphalt, compacted snow, and freezing/icy roads) is illustrated. The slip ratio of the vehicle, λ, maybe defined by equation (1):

$$\lambda = \frac{V_w - V_c}{V_w} \quad (1)$$

where $V_w$ is the speed of one or more of the wheels 42, 43 and $V_c$ is the speed of the vehicle 10.

Graph 100 illustrates that as the slip ratio, λ, increases the stability (e.g., the ability to steer the vehicle in a desired direction) of the vehicle decreases. Increasing the slip ratio, λ, may also result in increasing the stopping distance of the vehicle increases. Increasing the slip ratio, λ, may be caused by an application of the friction brakes 60 that results in a locking of the wheels 42, 43. In vehicles that include an Anti-lock Brake System (ABS), the ABS prevents the wheels 42, 43 from locking up and reduces the total braking distance. When wheel lockup is detected based on estimating the slip ratio, λ, utilizing equation 1 above, the ABS reduces the pressure applied to the brake actuators (e.g., pneumatic or hydraulic pistons) and returns the wheels to a spinning state. The vehicle 10 may include sensors that measure wheel speed and vehicle speed, which are then applied to equation 1 to estimate the slip ratio, λ. ABS can maximize the longitudinal tire-road friction while keeping large lateral forces. ABS is generally achieved through the control of hydraulic or pneumatic pressure for mechanical wheel brake actuators. ABS may pulse the pressure of the actuators such that the torque applied to the friction brakes increases and decreases cyclically (i.e., oscillates) along a wave function, such as a sine wave. This allows the vehicle operator to control (e.g., steer) the vehicle while maintaining the desired braking operation. During an anti-lock braking operation, an anti-lock braking controller may drive the slip ratio, λ, to an optimal band of slip ratios, $\lambda_{opt}$, that is between stable and unstable slip ratio values, λ.

In vehicles that include electric machines that are capable regenerative braking (i.e., electric and hybrid vehicles), regenerative braking control is traditionally turned off when the ABS is active. The reason that regenerative braking control is traditionally turned off when the ABS is active, is that the regenerative brake torque from the electric machine tends to lock up the wheels on the axle that the electric machine is drawing kinetic energy from, which increasing the possibility of excess wheel slip. Such deactivation of the regenerative brake system substantially decreases the amount of energy recovered. The current application includes a control system that allows a vehicle to recover energy via regenerative braking while the ABS is active.

Figure 3:
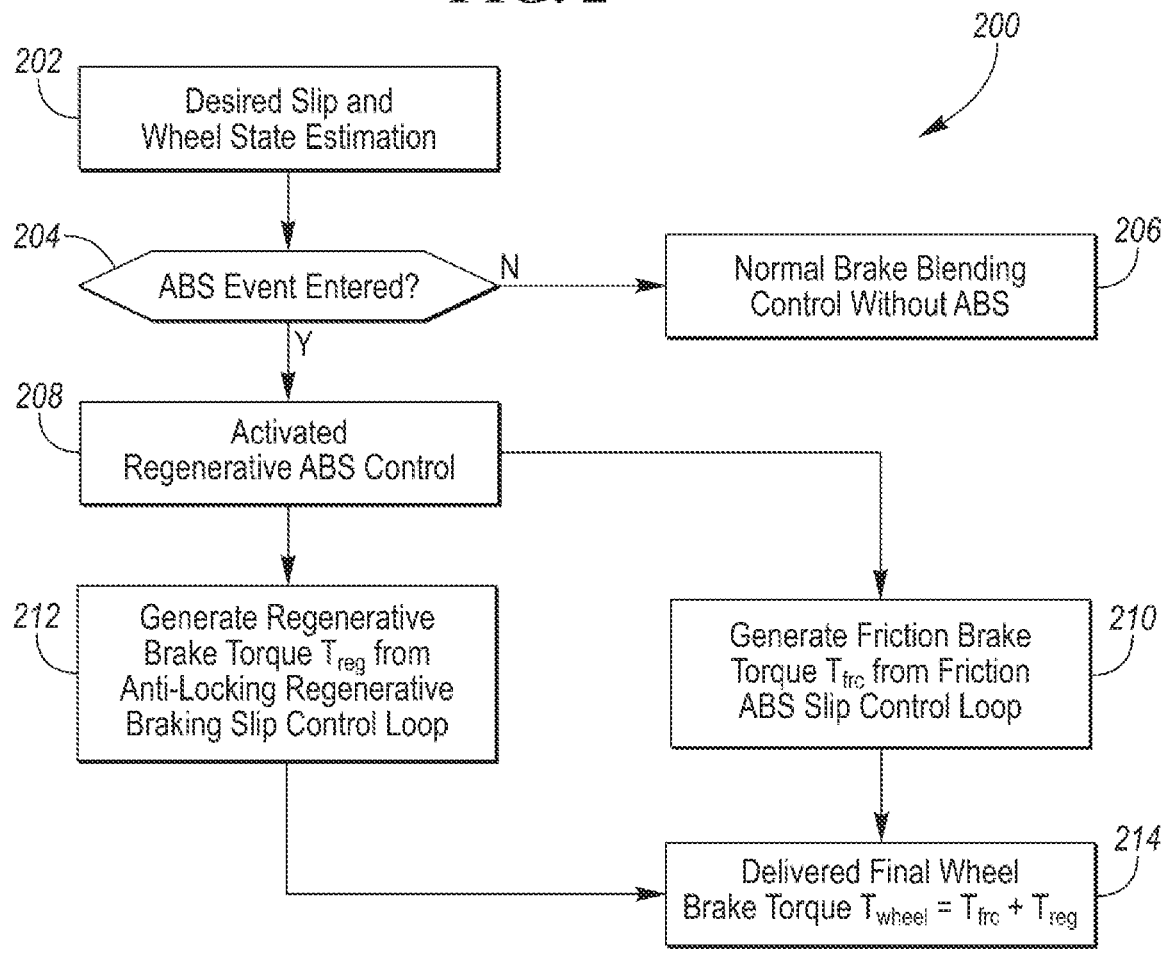
FIG. 3 is a flowchart illustrating a method of controlling regenerative braking and friction braking during an anti-lock braking event.

Referring to FIG. 3, a flowchart of a method 200 of controlling regenerative braking and friction braking during an anti-lock braking event is illustrated. The method 200 may be stored as control logic and/or an algorithm within the controller 50. The controller 50 may implement the method 200 by controlling the various components of the vehicle 10. The method 200 begins by generating a desired slip and a wheel state estimation. The desired slip may refer to the desired wheel slip ratio, $\lambda_{opt}$, and the wheel state estimation may refer to a current wheel slip ratio, λ, that is estimated utilizing equation (1) above. The desired wheel slip ratio, $\lambda_{opt}$, and the current wheel slip ratio, λ, are then input into decision block 204 where if it is determined if an ABS event (i.e., a braking event that triggers anti-lock braking) has been entered. An ABS event may be triggered if the slip ratio is within an unstable region (See FIG. 2).

If an ABS event has not been entered, the method 200 moves on to block 206 where normal brake blending control occurs or is maintained without the ABS system becoming active. Normal brake blending control includes a blend of regenerative braking and friction braking that depends on the battery state of charge and the torque limits of the electric machines that are operating as generator to recharge the battery 20 (e.g., the M/G 18 or the pair of motor/generators 62). Typically, under normal blending control where the battery 20 requires charging, the electric machine with operate at the maximum torque capacity to recharge the battery 20 and the friction brakes 62 will supplement the braking operation to provide brake torque for any remaining braking requirements, if any. If the battery 20 does not require charging under normal blending control, the friction brakes 62 may operate alone to provide all the torque for any braking requirements. If the vehicle includes a power sink, such as an electrical resisting element, the electric machine may still be utilized for braking purposes by directing the electrical power to the power sink in the event the battery 20 does not require charging.

Returning to block 204, if an ABS event has been entered, the method 200 moves on to block 208 where a regenerative braking/ABS braking control methodology is implemented that allows for simultaneous regenerative braking and anti-lock braking. Next, the method 200 simultaneously moves on to blocks 210 and 212. At block 210 a friction brake torque, $T_{frc}$, is generated by an ABS slip control loop. At Block 212, a regenerative braking torque, $T_{reg}$, is generated by an anti-locking regenerative braking slip control loop. The friction brake torque, $T_{frc}$, and the regenerative braking torque, $T_{reg}$, are then input into block 214, which delivers the final braking torque to the wheels, $T_{wheel}$, of the vehicle 10. The final braking torque to the wheels of the vehicle is the sum of the friction brake torque, $T_{frc}$, and the regenerative braking torque, $T_{reg}$, and may be represented by equation (2):

$$T_{wheel} = T_{frc} + T_{reg} \quad (2)$$

Figure 4:
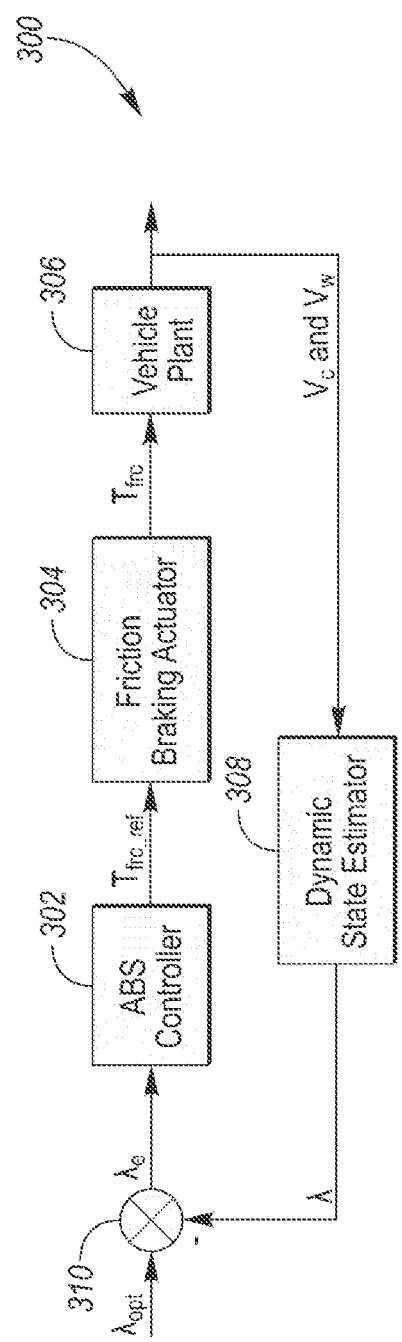
FIG. 4 illustrates a method for controlling the torque of friction brakes during the anti-lock braking event.

Referring to FIG. 4, a method 300 for controlling the torque of the friction brakes 60 during an anti-lock braking event is illustrated. The method may be stored as control logic and/or an algorithm within the controller 50. The controller 50 may implement the method 300 by controlling the various components of the vehicle 10. The method 300 corresponds to the ABS slip control loop that generates the friction brake torque, $T_{frc}$, in block 210 of method 200 above. The method 300 includes an ABS controller 302. The ABS controller 302 may include a proportional term, an integral term, and/or a derivative term. For example, if the ABS controller 302 includes all three terms, the ABS controller 302 may be referred to as a proportional-integral-derivative (PID) controller. The ABS controller may further include single gain term, $K_{frc}$, or a gain term for each of the proportional term, integral term, and/or derivative terms, which acts as a tuning parameter. The output of the ABS controller 302 is a reference or commanded torque, $T_{frc\_ref}$, which is then delivered to a friction braking actuator 304, such as a pneumatic or hydraulic piston. The input to the ABS controller 302 is an error (i.e., a difference) between the desired wheel slip ratio, $\lambda_{opt}$, and the current/estimated wheel slip ratio, $\lambda$. The error between the desired wheel slip ratio, $\lambda_{opt}$, and the current/estimated wheel slip ratio, $\lambda$, may be represented by $\lambda_e$.

The friction braking actuator 304 (e.g., a hydraulic piston) outputs an actual friction brake torque, $T_{frc}$, which is then input into the vehicle plant 306 (i.e., vehicle 10), which outputs vehicle speed, $V_c$, and the wheel speed, $V_w$. The actual friction brake torque, $T_{frc}$, may be estimated or measured by sensors that detect torque applied to the wheels 42, 43, via the friction brakes 60 or may be estimated based on sensors that measure the pressure within the hydraulic or pneumatic system that is actuating the friction brakes 60. More specifically, the friction braking actuator 304 may be controlled via a closed loop pressure control system. The closed loop pressure control system may measure the hydraulic braking system output pressure, compare the hydraulic braking system output pressure with a pressure reference (e.g., a desired or commanded pressure) to control the hydraulic pressure of the friction baking system to the desired level. The reference or commanded torque, $T_{frc\_ref}$, and the actual friction brake torque, $T_{frc}$, may be proportional to the desired pressure and the output pressure of the friction braking actuator 304, respectively, and therefore may be estimated based on the desired pressure and the output pressure of the friction braking actuator 304, respectively. The vehicle speed, $V_c$, and the wheel speed, $V_w$, are then input into a dynamic state estimator 308 which calculates the current/estimated wheel slip ratio, $\lambda$, via equation (1). The current/estimated wheel slip ratio, $\lambda$, is then subtracted from the desired wheel slip ratio, $\lambda_{opt}$, at subtraction node 310 in order to calculate the error, $\lambda_e$, between the desired wheel slip ratio, $\lambda_{opt}$, and the current/estimated wheel slip ratio, $\lambda$. The error, $\lambda_e$, is then input into the ABS controller 302 in order provide a feedback control to the ABS controller 302. The goal/purpose of the ABS slip control loop (i.e., method 300) is to drive the current/estimated wheel slip ratio, $\lambda$, toward the desired wheel slip ratio, $\lambda_{opt}$, to prevent the wheels of the vehicle 10 from locking up, increase the stability of the vehicle 10, and reduce the total braking distance.

Figure 5:
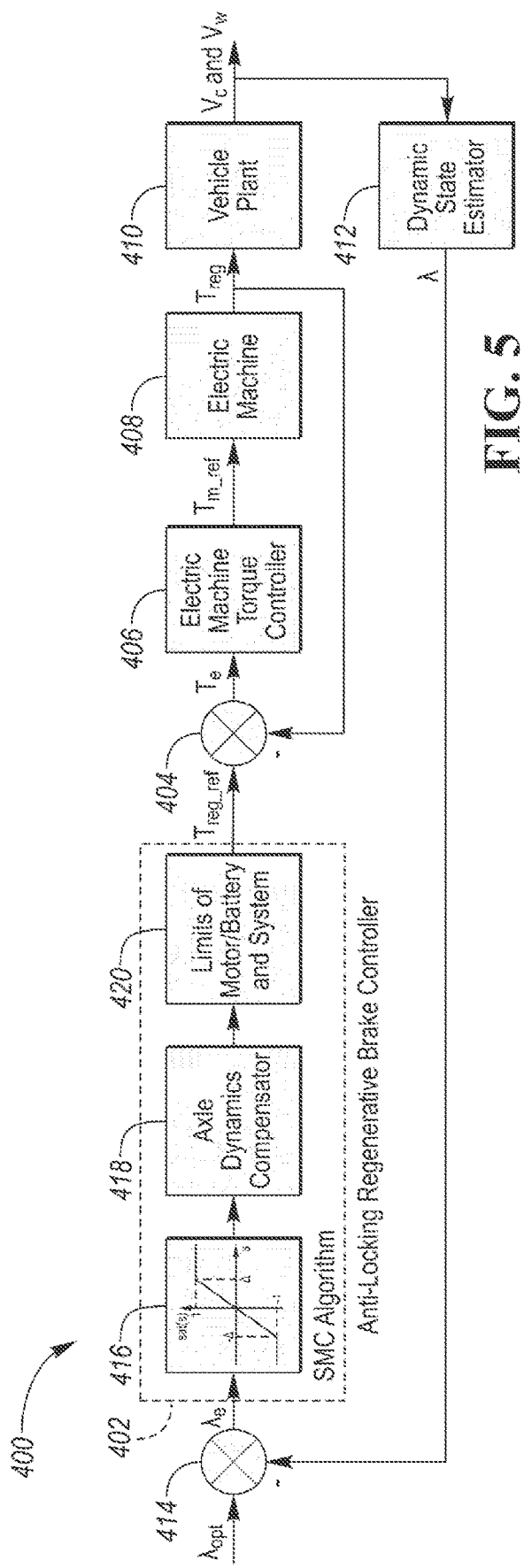
FIG. 5 illustrates a method for controlling the torque of an electric machine for regenerative braking purposes during the anti-lock braking event.
Figure 6:
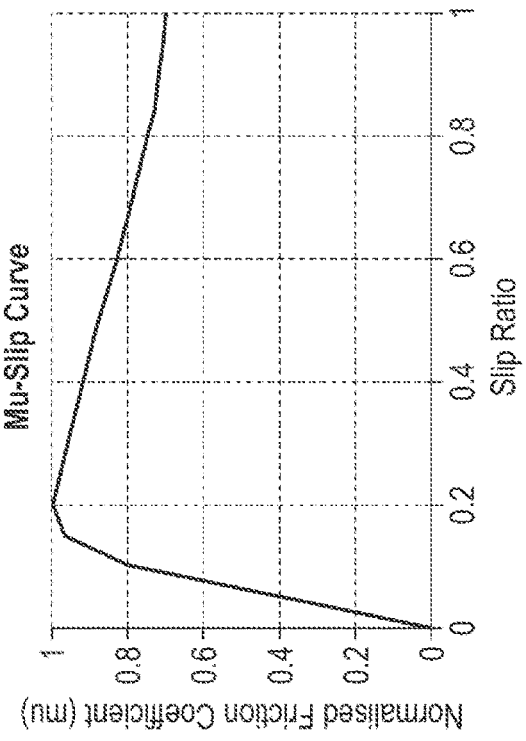
FIG. 6 is a graph that represents a coefficient of friction/slip ratio curve that was utilized during simulation tests of anti-lock braking events.

Referring to FIG. 5, a method 400 for controlling the torque of an electric machine (e.g., M/G 18 or motor/generators 62) for regenerative braking purposes during an anti-lock braking event is illustrated. The method may be stored as control logic and/or an algorithm within the controller 50. The controller 50 may implement the method 400 by controlling the various components of the vehicle 10. The method 400 corresponds to the anti-locking regenerative braking slip control loop that generates the regenerative braking torque, $T_{reg}$, in block 212 of method 200 above. The method 400 includes an anti-locking regenerative braking controller 402. The output of the anti-locking regenerative braking controller 402 is a reference or commanded regenerative braking torque, $T_{reg\_ref}$, which is then delivered to a subtraction node 404. The input to the anti-locking regenerative braking controller 402 is an error (i.e., a difference) between the desired wheel slip ratio, $\lambda_{opt}$, and the current/estimated wheel slip ratio, $\lambda$. The error between the desired wheel slip ratio, $\lambda_{opt}$, and the current/estimated wheel slip ratio, $\lambda$, may be represented by $\lambda_e$.

The output of the subtraction node 404 is an error (i.e., a difference) between the reference or commanded regenerative braking torque, $T_{reg\_ref}$, and an actual or measured regenerative braking torque of an electric machine (e.g., the M/G 18 or the pair of motor/generators 62), $T_{reg}$, that is providing the regenerative braking torque. The error between the reference or commanded regenerative braking torque, $T_{reg\_ref}$, and the actual or measured regenerative braking torque of the electric machine, $T_{reg}$, may be represented by $T_e$. The actual or measured regenerative braking torque of the electric machine, $T_{reg}$, may be estimated or measured by sensors that detect the regenerative braking torque that is being produced by the electric machine, may be estimated based on the electrical power that is being produced by the electric machine during regenerative braking, or may be based on the amount of electric current energizing the coils of the electric machine during regenerative braking. For example, the electric machine torque produced by the electric machine during regenerative braking may be a function or proportional to electrical power that is being produced by the electric machine or to the amount of electric current energizing the coils of the electric machine.

The error, $T_e$, between the reference or commanded regenerative braking torque, $T_{reg\_ref}$, and the actual or measured regenerative braking torque of the electric machine, $T_{reg}$, is input into an electric machine controller 406. The electric machine controller 406 may include a proportional term, an integral term, and/or a derivative term. For example, if the electric machine controller 406 includes all three terms, the electric machine controller 406 may be referred to as a proportional-integral-derivative (PID) controller. The electric machine controller 406 may further include a single gain term, K, or a gain term for each of the proportional term, integral term, and/or derivative terms, which acts as a tuning parameter. The output of electric machine controller 406 is a reference or commanded torque, $T_{m\_ref}$, which is then delivered to an electric machine 408, such as M/G 18 or the pair of motor/generators 62. The actual or measured regenerative braking torque of the electric machine, $T_{reg}$, is then input into the subtraction node 404 for calculating the error, $T_e$, between the reference or commanded regenerative braking torque, $T_{reg\_ref}$, and the actual or measured regenerative braking torque of the electric machine, $T_{reg}$, in order provide a feedback control to the electric machine 408.

The actual or measured regenerative braking torque of the electric machine, $T_{reg}$, is also is input into the vehicle plant 410, which outputs vehicle speed, $V_c$, and the wheel speed, $V_w$. The vehicle speed, $V_c$, and the wheel speed, $V_w$, are then input into a dynamic state estimator 412 which calculates the current/estimated wheel slip ratio, $\lambda$, via equation (1). The current/estimated wheel slip ratio, $\lambda$, is then subtracted from the desired wheel slip ratio, $\lambda_{opt}$, at subtraction node 414 in order to calculate the error, $\lambda_e$, between the desired wheel slip ratio, $\lambda_{opt}$, and the current/estimated wheel slip ratio, $\lambda$. The error, $\lambda_e$, is then input into anti-locking regenerative braking controller 402 in order provide a feedback control to the anti-locking regenerative braking controller 402.

The anti-locking regenerative braking controller 402 includes a sliding mode sub-controller 416. The sliding mode sub-controller 416 includes an algorithm that is not a continuous function of time. The algorithm switches from one continuous structure to another based on the current status in the state space. Therefore, algorithm of the sliding mode sub-controller 416 is a variable structure control method. The ultimate trajectory slides along the boundaries of the control structures. The motion of the system as it slides along these boundaries is called a sliding mode. The algorithm of the sliding mode sub-controller 416 utilizes a high-speed switching control law to drive the nonlinear plant's state trajectory onto a specified switching surface by changing the switching sign and unity switching gain. The switching gain, sat(s), can be varied according to the distance between the current state and the sliding surface. The sliding mode sub-controller 416 in FIG. 4 illustrates the switching function and rules, which may be represent by (3):

$$sat(s) = \begin{cases} 1 & s > \Delta \\ ks & |s| = \Delta \\ -1 & s < \Delta \end{cases} \quad (3)$$

Where $\Delta$ is positive and defines the threshold of the boundary, k is a positive value to determine the slope, and s represents the sliding surface of the algorithm of the sliding mode sub-controller 416.

The sliding action of the sliding mode sub-controller 416 algorithm generates switching between these two systems structures. One of the system structures is to reduce regenerative braking torque and the other is to increase the regen brake torque. In other words, sliding mode sub-controller 416 algorithm generates a discontinuous control signal to generate a regenerative braking torque reference to "hold" the axle that is providing torque to the electric machine for regenerative braking in order to provide regenerative braking torque as large as possible, or to 'release" the axle that is providing torque to the electric machine for regenerative braking in order to prevent the axle from locking up.

The anti-locking regenerative braking controller 402 also includes an axle dynamics compensator 418 that includes an algorithm that accounts for energy absorbed by a vehicle axle during a breaking event. The axle dynamics compensator 418 model accounts for energy that may be absorbed by the axle (i.e., axle 45) or any axle subcomponents (e.g., shocks or struts) and adjusts any regenerative braking command to the electric machine in order to prevent the regenerative braking torque of the electric machine from overshooting any desired value. Furthermore, the axle dynamics compensator 418 may adjust any regenerative braking command to the electric machine such that regenerative braking torque increases monotonically during an anti-lock braking event. The axle dynamics compensator 418 may model the axle dynamics based on the following transfer function (4):

$$\frac{a_2 s^2 + a_1 s + a_0}{b_2 s^2 + b_1 s + b_0} \quad (4)$$

The anti-locking regenerative braking controller 402 also takes into account the limits of the electric machine (e.g., the torque limits of the M/G 18 or motor generators 62) and the limits of the battery 20 (e.g., the ability of the battery 20 to receive electrical power based the current state of charge) at block 420. For example, the anti-locking regenerative braking controller 402 will limit regenerative braking of the electric machine to the torque limits and the ABS slip control loop (i.e., method 300) will command the friction brakes 60 to provide the remaining demanded brake torque. As another example, if the battery 20 is incapable of receiving any additional charge, the anti-locking regenerative braking controller 402 may command zero torque to the electric machine and the ABS slip control loop (i.e., method 300) will command the friction brakes 60 to provide all of the demanded brake torque. The goal/purpose of the anti-locking regenerative braking slip control loop (i.e., method 400) is to drive the current/estimated wheel slip ratio, $\lambda$, toward the desired wheel slip ratio, $\lambda_{opt}$, to prevent the wheels of the vehicle 10 from locking up, increase the stability of the vehicle 10, and reduce the total braking distance, while also allow for regenerative braking to recharge the battery 20.

The aggregate control system described in FIG. 3-5 may be implemented to the control the torque of one or more electric machines according to a single desired regenerative braking torque and/or to control the torque of one or more of the friction brakes 60 according to a single desired friction brake torque. Alternatively, especially in the case where an electric machine is secured to each wheel (or half shaft) of a single axle (e.g., pair of electric machines 62), the torque control of each electric machine and the torque control of each friction brake may be adjusted individually based on the slip ratio, $\lambda$, that each wheel is experiencing and the desired wheel slip ratio, $\lambda_{opt}$, of each wheel. Essentially, the electric motor/generator and friction brake associated with each wheel may include their own controllers that operate according to the methods described in FIGS. 3-5.

Referring to FIGS. 6-13, parameters and results of simulation tests of the control system outlined in FIGS. 3-5 are illustrated. The simulation model was created to compare the proposed design with an existing design where regenerative braking is turned off during anti-lock braking. Some of the control parameters during the simulation testing included: (1) controlling the braking torque (friction and/or regenerative) of a right wheel and left wheel on single axle during an anti-lock braking event; (2) each wheel included a single friction brake and a single electric machine for regenerative braking; (3) assuming the road wheel contact surfaces of the right and left wheels were completely the same during simulation tests 1-5 and different during simulation tests 6-7; (4) simulating a random variation of the normalized friction coefficient, Mu (which may also be referred to as µ) between the wheels and the road surface (the random variation of Mu was based on the Mu-slip curve in FIG. 6); and (5) modeling the vehicle axle as a system of rotating inertias where the connections between the inertias are modeled as spring (with stiffness factor k) and damper (with damping factor c). A time delay T=0.3 (sec) was also introduce in each axle in response to an anti-lock braking event.

The simulation tests include simulation tests 1-7. Simulation test 1 (FIG. 7) included use of the friction ABS control (i.e., method 300) only. Simulation test 2 (FIG. 8) included use of the integrated friction ABS and regen brake controls (methods 200, 300, and 400). The generated regenerative brake toque has an overshoot (i.e., the increase in the absolute value is greater than the desired absolute value) response due to axle underdamping dynamics, because the axle dynamics compensator 418 was turned off during simulation test 2. Simulation test 3 (FIG. 9) included use of the integrated friction ABS and regen brake controls (methods 200, 300, and 400) with the axle dynamics compensator 418 turned on. Simulation test 4 (FIG. 10) included use of the friction ABS control (i.e., method 300) only with an adjusted controller gain term $K_{fic}$ for the ABS slip control loop (i.e., method 300). Simulation test 5 (FIG. 11) included use of the integrated friction ABS and regen brake controls (methods 200, 300, and 400) with the adjusted controller gain term $K_{fic}$ for the ABS slip control loop (i.e., method 300). The generated regenerative brake toque has an overshoot response due to axle underdamping dynamics because the axle dynamics compensator 418 was turned off during simulation test 5. Simulation test 6 (FIG. 12) included use of the friction ABS control (i.e., method 300) only where the left wheel and the right wheel are on surfaces with different normalized friction coefficients, Mu. Simulation test 7 (FIG. 13) included use of the integrated friction ABS and regen brake controls (methods 200, 300, and 400) where the left wheel and the right are on surfaces with different normalized friction coefficients, Mu. The generated regenerative brake toque has an overshoot response due to axle underdamping dynamics because the axle dynamics compensator 418 was turned off during simulation test 7.

Figure 7:
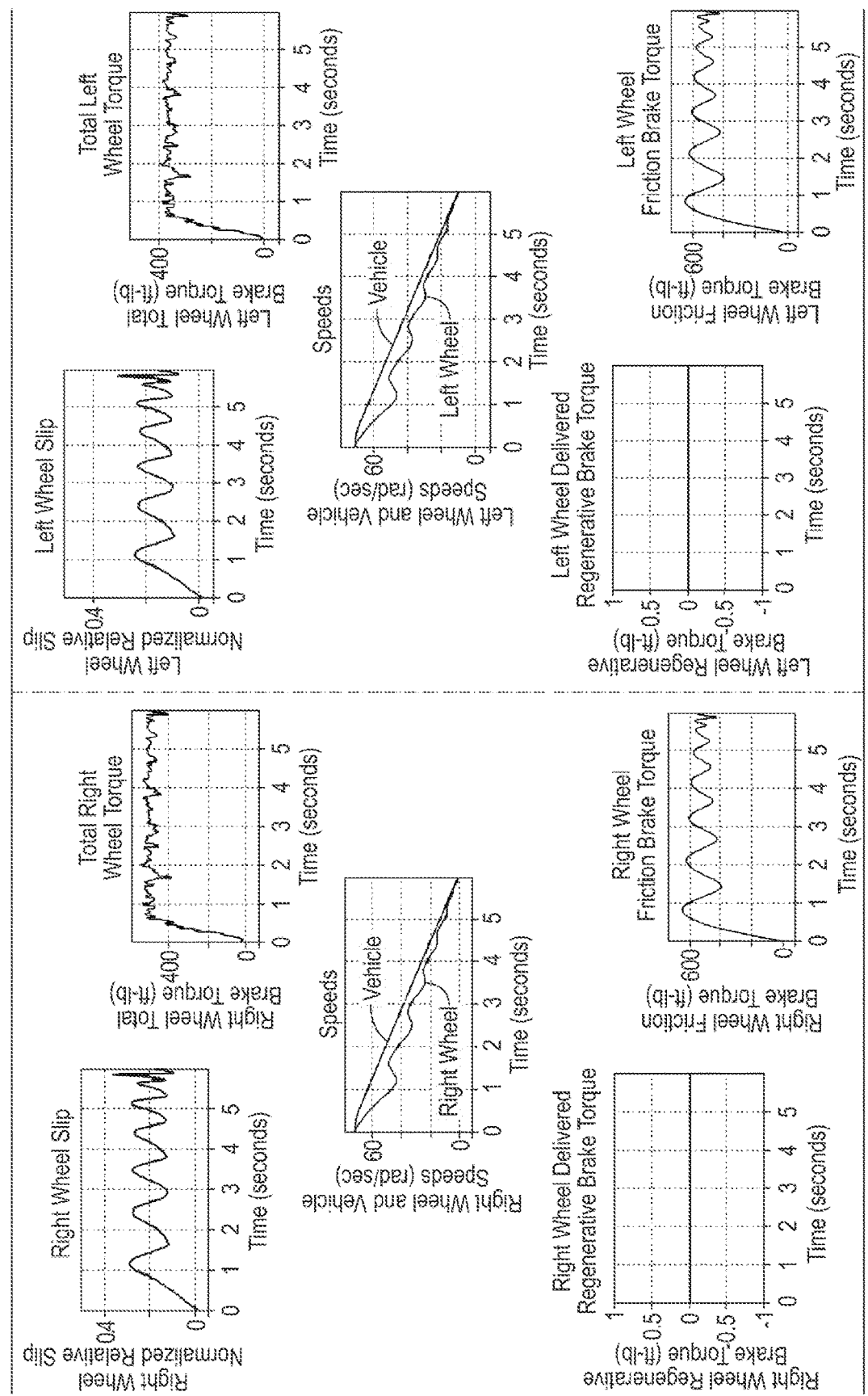
FIGS. 7-13 represent the results of the simulation tests.

Simulation test 1 included friction brake control only (i.e., method 300) during the anti-lock braking event. Simulation test 1 assumed that the road surface conditions of both right and left wheels were same (same surface Mu values). The regenerative braking torque was kept to zero during the anti-lock braking event of simulation test 1. FIG. 7 shows the results of simulation test 1 including the vehicle speed, right and left wheel speeds, right and left wheel slip ratios, $\lambda$, right and left wheel total braking torques, right wheel and left wheel regenerative braking torques, and right wheel friction brake torque. It is observed that the dynamic responses of both wheels are substantially the same, and the vehicle stops at about t=5.9769 (sec) after initiation of the anti-lock braking event.

Figure 8:
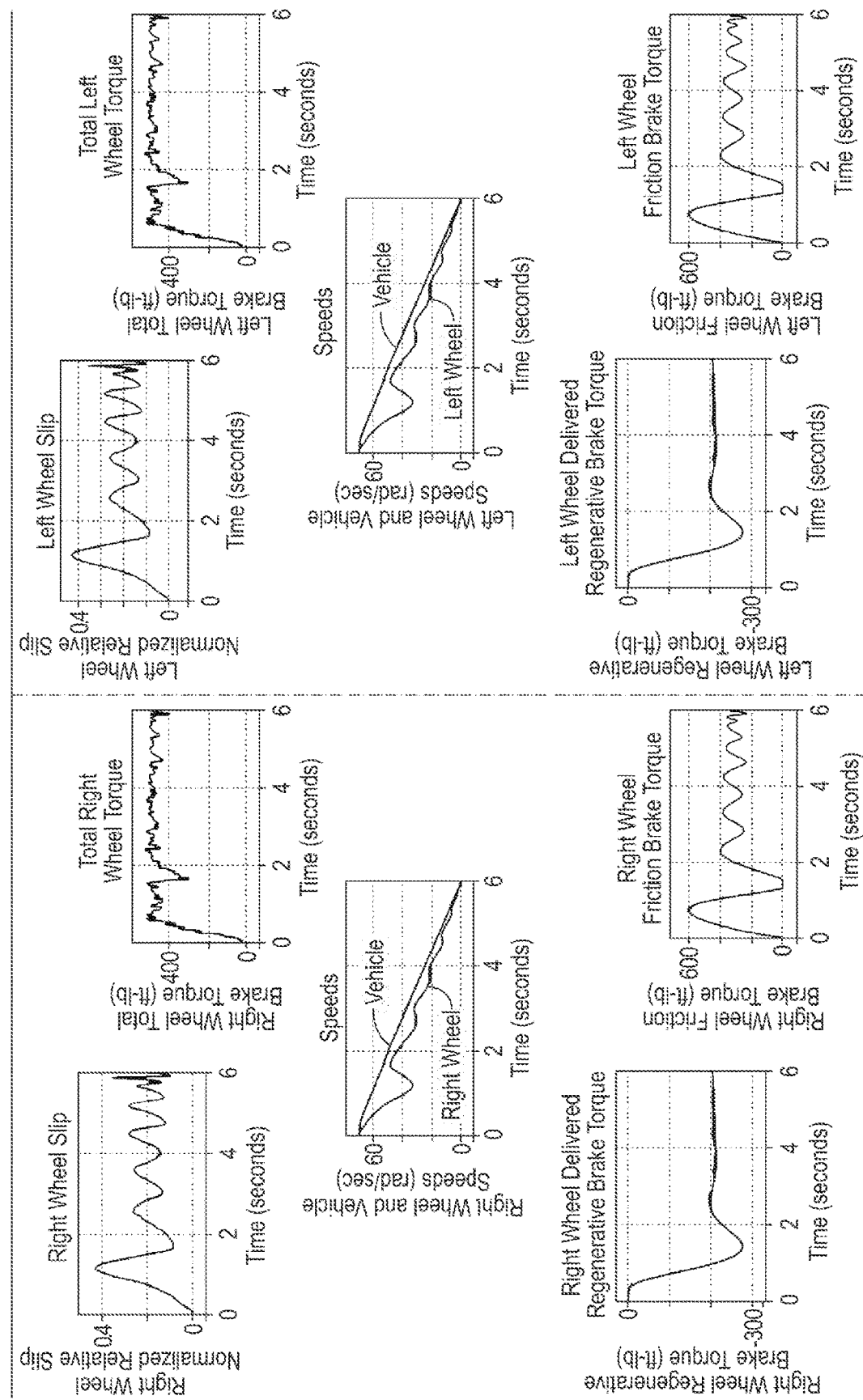

Simulation test 2 included both regenerative braking control and friction braking control (i.e., methods 200, 300, and 400) during the anti-lock braking event with the axle dynamics compensator 418 in the anti-locking regenerative braking slip control loop (i.e., method 400) turned off. It is assumed that the road conditions (e.g., Mu values) are the same as in simulation test 1. FIG. 8 shows the results of simulation test 2 including the vehicle speed, right and left wheel speeds, right and left wheel slip ratios, $\lambda$, right and left wheel total braking torques, right wheel and left wheel regenerative braking torques, and right wheel friction brake torque. It is observed that regenerative braking torque is adjusted automatically by the proposed closed loop control algorithm (i.e., method 400) to maintain the desired slip ratio value, $\lambda_{opt}$, and to prevent the wheels from locking up and that the final brake torque is the sum of regen brake torque and friction brake torque.

It is further observed that the dynamic responses of both wheels are the same, and the vehicle stops at about t=6.0563 (sec). Compared with the stop time (t=5.9769 (sec)) in simulation test 1, the stop time is only 0.0794 sec longer. From a control point view, this minor delay is caused by the regenerative braking torque that is transferred from the electric machines (e.g., electric motor/generators 62) to the road wheels through the axle systems with compliance. Furthermore, it can be observed that the regenerative braking torque overshoots the desired value (i.e., the regenerative braking torque is driven toward approximately −200 ft-lb but overshoots that value and obtains a value of approximately −275 ft-lb before being driven back toward −200 ft-lb). However, these side effects can be improved by turning on the axle dynamics compensator 418 in the anti-locking regenerative braking slip control loop (i.e., method 400). It should be noted that overshooting of regenerative braking torque may also lead to overshoot of the friction brake torque.

It should be noted that any reference to an increase in regenerative braking torque herein may refer to an increase in an absolute value, which would include an increase in a negative value (e.g., going from −50 ft-lb to −200 ft-lb may be referred to as an increase in regenerative braking torque). It should also be noted that the total left wheel and total right wheel braking torques in FIGS. 7-13 are the sums of the absolute values of their respective friction and regenerative braking torques.

The regen brake torque responses in simulation test 2 shown in FIG. 8, illustrate the effect of axle dynamics for the regen brake torque with time delay and overshoot. It also can be observed that the initial wheel slip in simulation test 2 is higher than that in simulation test 1. As a result, such torque response also affects friction brake torque response (higher magnitude changes in the oscillations), as shown in FIG. 8.

Figure 9:
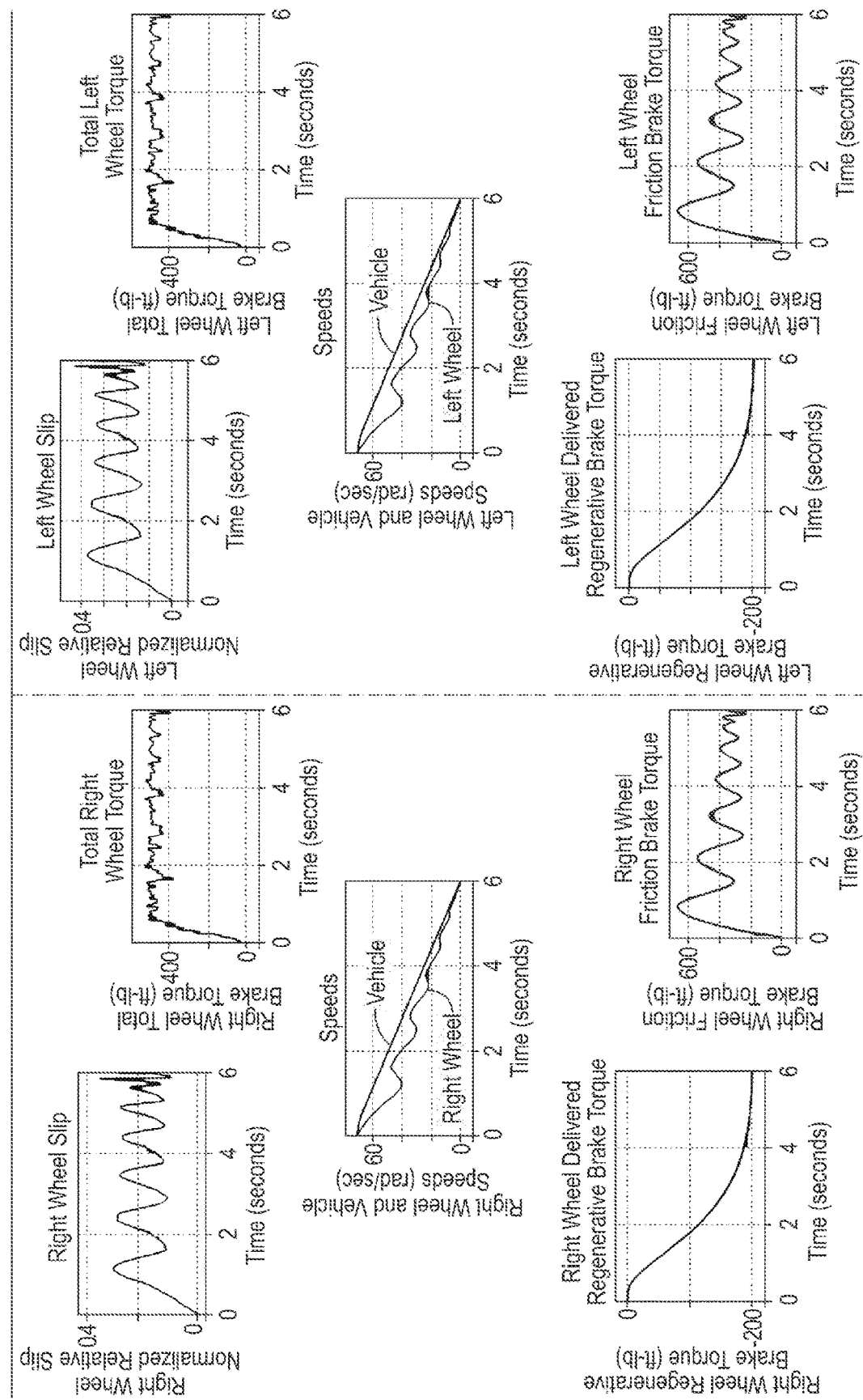

Simulation test 3 included both regenerative braking control and friction braking control (i.e., methods 200, 300, and 400) during the anti-lock braking event with the axle dynamics compensator 418 in the anti-locking regenerative braking slip control loop (i.e., method 400) turned on. It is assumed that the road conditions (e.g., Mu values) are the same as in simulation tests 1 and 2. FIG. 9 shows the results of simulation test 3 including the vehicle speed, right and left wheel speeds, right and left wheel slip ratios, a, right and left wheel total braking torques, right wheel and left wheel regenerative braking torques, and right wheel friction brake torque. It is observed that both regenerative braking torque and friction brake torque dynamic performances are improved. For example, the initial wheel slip in simulation test 3 is not significantly higher than that in simulation test 1 (which was the case in simulation test 2) and the regenerative braking torque does not overshoot the desired value. The regenerative braking torque approaches the desired value (i.e., approximately 200 ft-lb) along a monotonic curve. The stop time of the vehicle 10 in simulation test 3 is also reduced to t=6.0117 (sec), which is a difference of 0.0446 (sec) when compared to simulation test 2. By fine tuning the regenerative brake controller (i.e., method 400) parameters, it is possible to maintain the approximate stop time of simulation test 1, where only friction braking was utilized.

Figure 10:
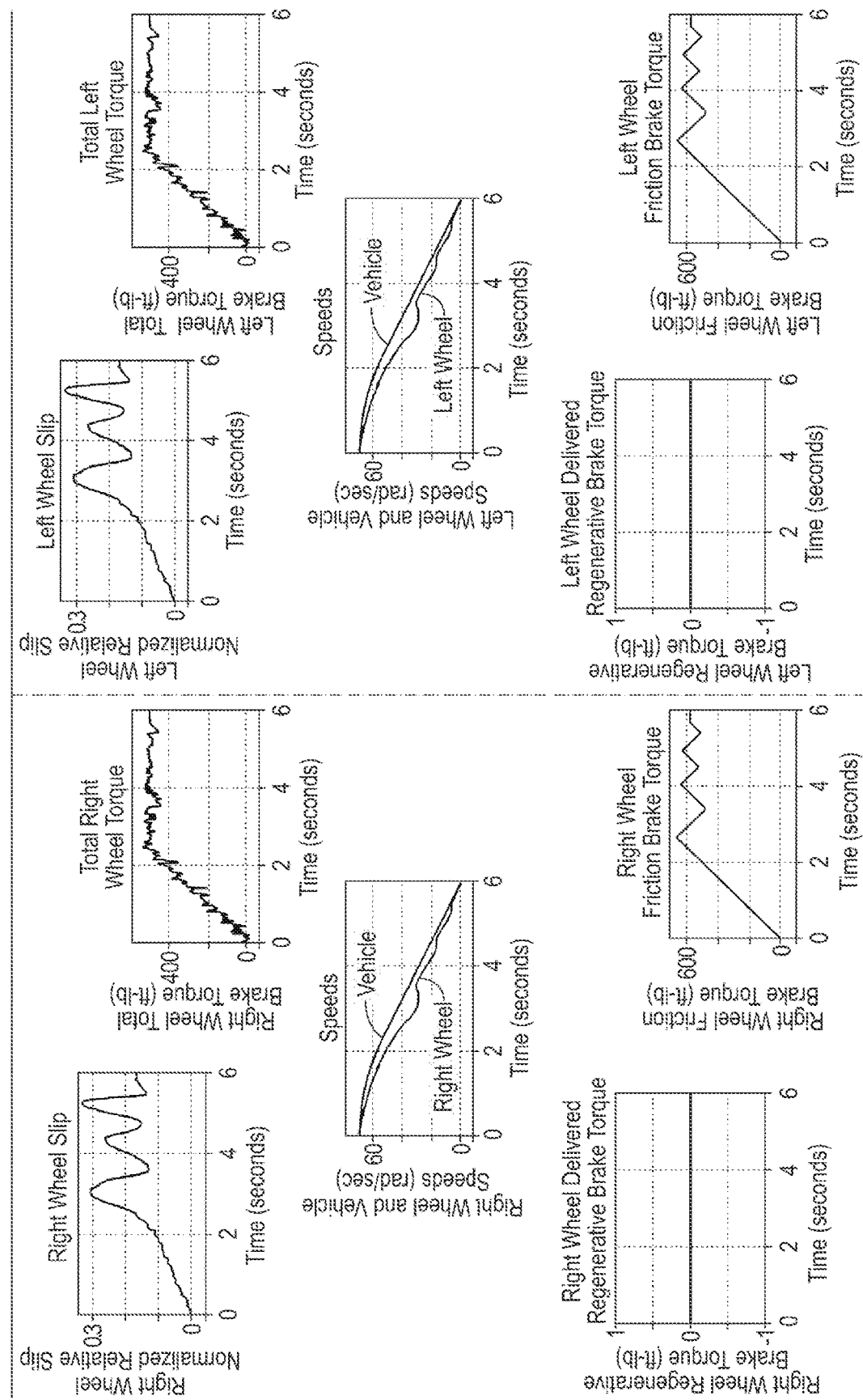
Figure 11:
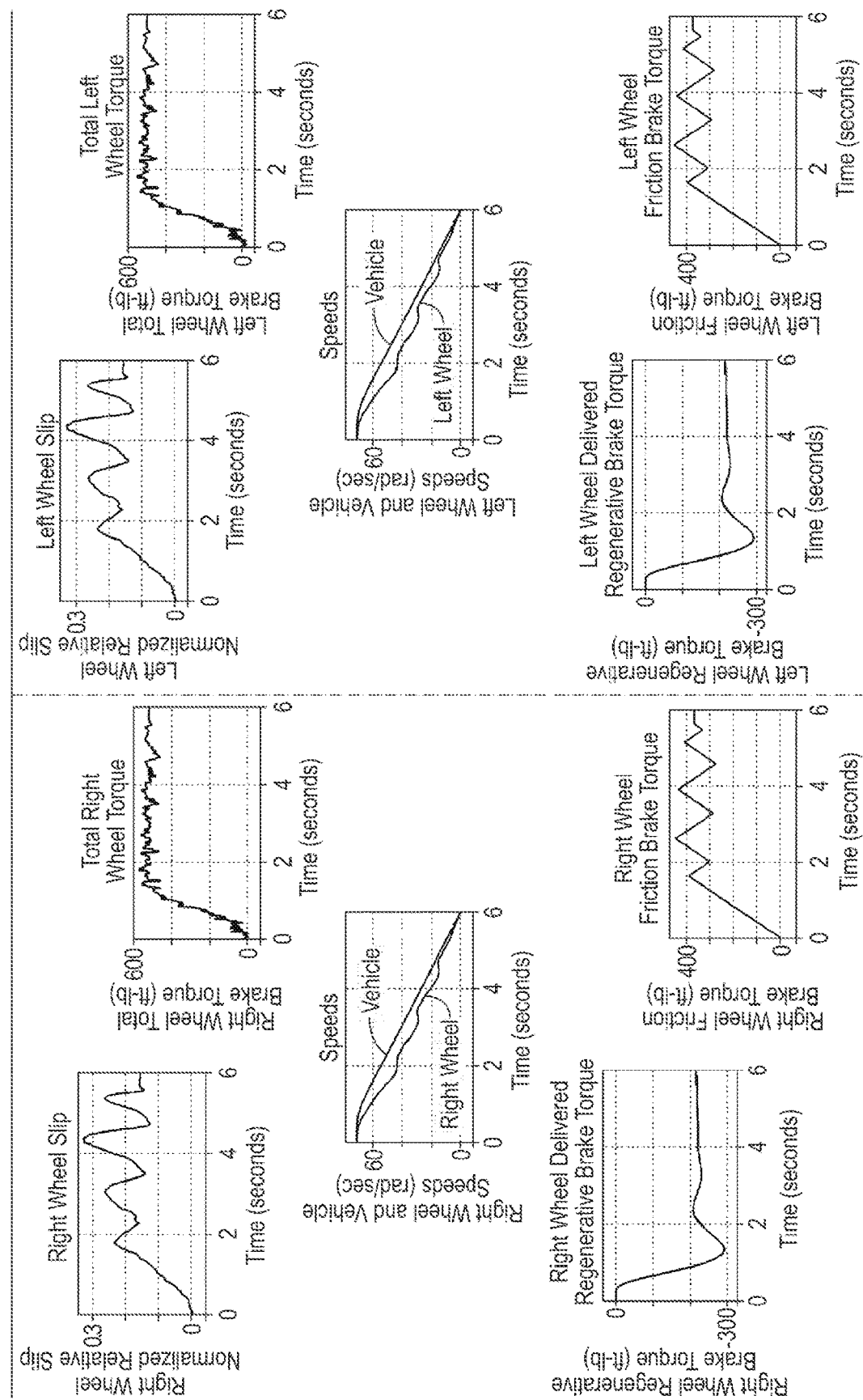

In simulation tests 4 and 5, the controller gain of the ABS slip control loop (i.e., method 300) was reduced to $0.2*K_{fic}$ when compared to the gain $K_{fic}$ that was utilized in simulation tests 1-3. Simulation test 4 included friction brake control only (i.e., method 300) during the anti-lock braking event. Simulation test 5 included both regenerative braking control and friction braking control (i.e., methods 200, 300, and 400) during the anti-lock braking event with the axle dynamics compensator 418 in the anti-locking regenerative braking slip control loop (i.e., method 400) turned off. FIGS. 10 and 11 show the results of simulation tests 4 and 5, respectively, including the vehicle speed, right and left wheel speeds, right and left wheel slip ratios, a, right and left wheel total braking torques, right wheel and left wheel regenerative braking torques, and right wheel friction brake torque. Other than the adjustment to the controller gain of the ABS slip control loop, simulation test 4 was conducted according the same parameters simulation test 1 and simulation test 5 was conducted according the same parameters simulation test 2.

It is observed in simulation tests 4 and 5 that the response time (i.e., the stopping time) during the anti-lock braking event is longer because the friction brake controller gain is smaller. The stop time is reduced from t=7.0966 (sec) in simulation test 4, which only utilized friction brake control and not regenerative brake control (i.e., method 300 only), and to t=6.4597 (sec) in simulation test 5, which utilized regenerative and friction brake control (i.e., methods 200, 300, and 400). Therefore, it is observed in simulation tests 4 and 5 that the improvement in stopping time (i.e., the decrease in stopping time) during the anti-lock braking event due the regenerative braking controller (i.e., method 400) depends on the design of friction brake controller (i.e., method 300). The goal is to design the regenerative braking controller (i.e., method 400) to match deceleration performance of the friction brake controller (i.e., method 300) during an anti-lock braking event.

Figure 12:
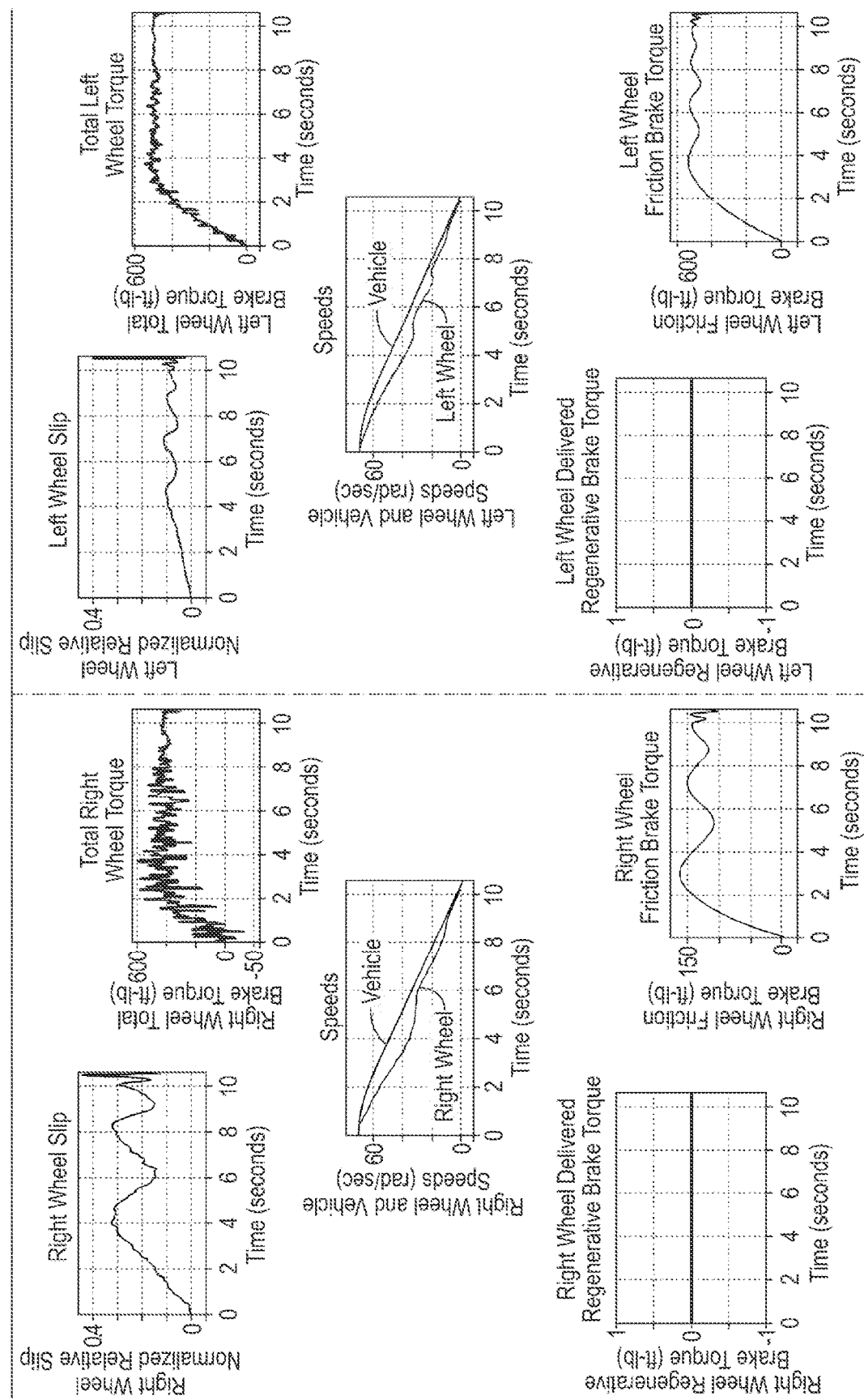
Figure 13:
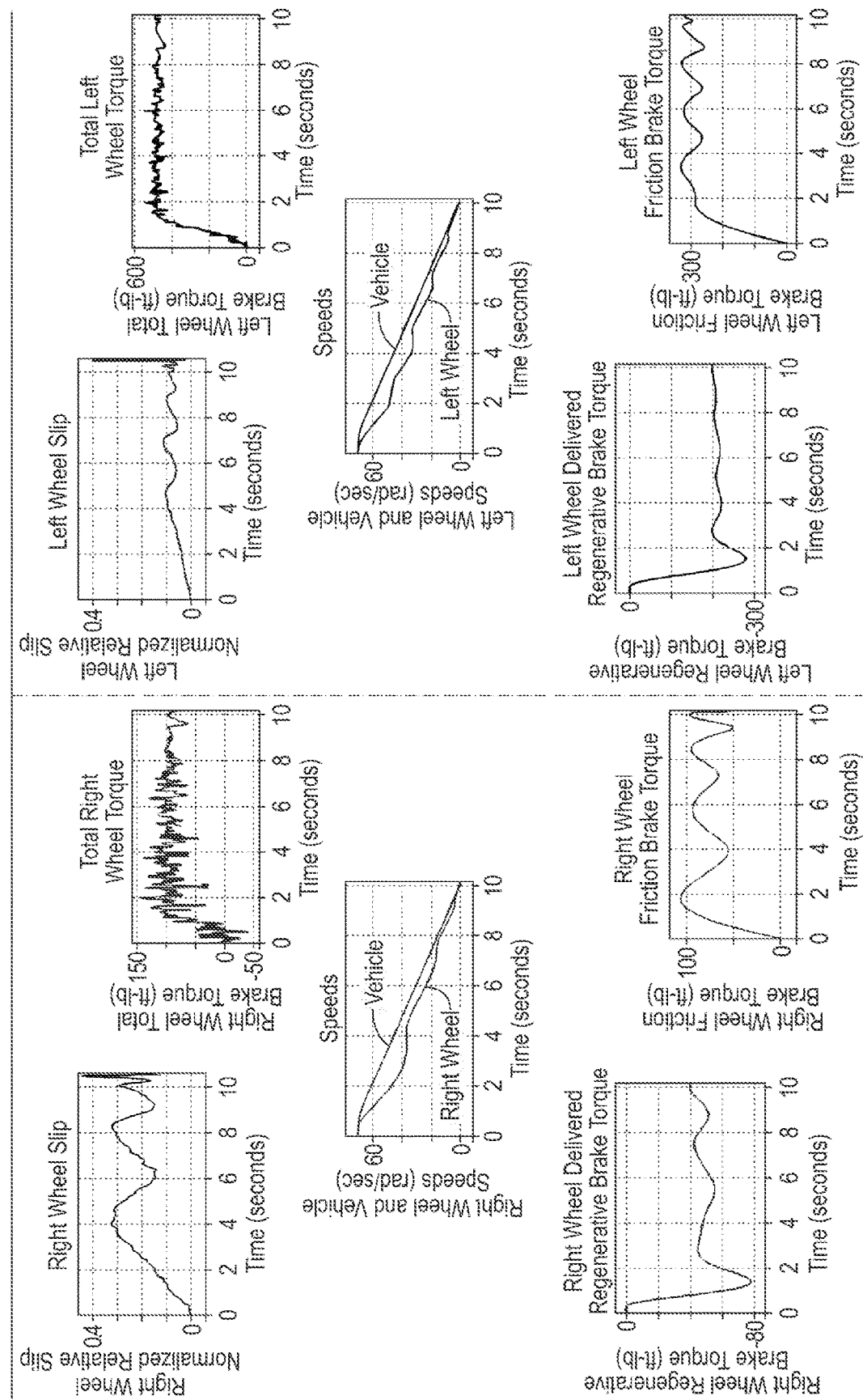

In simulation tests 6 and 7, it is assumed that right and left wheels are on different road surfaces. The left wheel was tested in simulation tests 6 and 7 with the same Mu-slip curves utilized in simulation tests 1-3. The normalized friction coefficient value, Mu, of the right wheel contact surface is assumed to be 0.2 time of that of left wheel (i.e., Mu(right wheel)=0.2*Mu(left wheel). Also, in simulation tests 6 and 7, the controller gain of the ABS slip control loop (i.e., method 300) was reduced to $0.1*K_{fic}$ when compared to the gain $K_{fic}$ that was utilized in simulation tests 1-3. Simulation test 6 included friction brake control only (i.e., method 300) during the anti-lock braking event. Simulation test 7 included both regenerative braking control and friction braking control (i.e., methods 200, 300, and 400) during the anti-lock braking event with the axle dynamics compensator 418 in the anti-locking regenerative braking slip control loop (i.e., method 400) turned off. FIGS. 12 and 13 show the results of simulation tests 6 and 7, respectively, including the vehicle speed, right and left wheel speeds, right and left wheel slip ratios, a, right and left wheel total braking torques, right wheel and left wheel regenerative braking torques, and right wheel friction brake torque.

Due to the difference in Mu values between the road contact surface and the right and left wheels of the axle, both of the friction brake torque and regen brake torque in each wheel is automatically adjusted to track the slip reference $\lambda_{opt}$=0.2 separately and to generate different final required wheel torques between the right and left wheels. The stop time during the anti-lock braking event is longer because one of wheels is being controlled on the lower Mu surface. Both the regenerative braking torque and friction brake torque is reduced in order to maintain vehicle stability. It is observed that the vehicle stops at about t=10.5829 (sec) in simulation test 6 and that the vehicle stops at about t=10.1305 (sec) in simulation test 7 due to the lower gains that were used in the friction brake controller (i.e., $0.10*K_{fic}$). Increasing the friction brake gain, $K_{fic}$, reduces the stop time difference between simulation test 6 and simulation test 7. It should be noted that the lower friction brake gain may help to improve brake feel, and also can reduce the possibility of the control module over-heating for the anti-lock braking systems.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to recharge a battery during regenerative braking;
   friction brakes configured to apply torque to wheels of the vehicle to decelerate the vehicle; and
   a controller programmed to,
      responsive to an anti-lock braking event, adjust a regenerative braking torque of the electric machine based on a difference between a desired wheel slip ratio and an actual wheel slip ratio, and
      responsive to the anti-lock braking event, adjust a braking torque of the friction brakes based on the difference between the desired wheel slip ratio and the actual wheel slip ratio, wherein a total braking torque is a sum of the regenerative braking torque of the electric machine and the braking torque of the friction brakes.

2. The vehicle of claim 1, wherein the controller is further programmed to oscillate the braking torque of the friction brakes during the anti-lock braking event.

3. The vehicle of claim 1, wherein the difference between a desired wheel slip ratio and an actual wheel slip ratio is based on a feedback control.

4. The vehicle of claim 1, wherein the controller is programmed to adjust the regenerative braking torque of the electric machine based on a sliding mode control algorithm.

5. The vehicle of claim 1, wherein the controller is programmed to adjust the regenerative braking torque of the electric machine based on an axle dynamics compensator algorithm, which accounts for energy absorbed by a vehicle axle, such that regenerative braking torque increases monotonically during the anti-lock braking event.

6. A vehicle comprising:
   an axle having first and second wheels;
   first and second electric machines secured to the axle adjacent to the first and second wheels, respectively, and configured to transfer energy from the first and second wheels, respectively, to a battery during regenerative braking;
   first and second friction brakes configured to apply torque to the first and second wheels, respectively, to decelerate the vehicle; and
   a controller programmed to, responsive to an anti-lock braking event, adjust a regenerative braking torque of the first electric machine based on a difference between a desired wheel slip ratio and an actual wheel slip ratio of the first wheel.

7. The vehicle of claim 6, wherein the controller is further programmed to, responsive to the anti-lock braking event, adjust a regenerative braking torque of the second electric machine based on a difference between a desired wheel slip ratio and an actual wheel slip ratio of the second wheel.

8. The vehicle of claim 6, wherein the controller is further programmed to, responsive to the anti-lock braking event, adjust a braking torque of the first friction brake based on the difference between the desired wheel slip ratio and the actual wheel slip ratio of the first wheel.

9. The vehicle of claim 8, wherein the controller is further programmed to, responsive to the anti-lock braking event, adjust a braking torque of the second friction brake based on a difference between the desired wheel slip ratio and the actual wheel slip ratio of the second wheel.

10. The vehicle of claim 9, wherein a total braking torque is a sum of the regenerative braking torques of the first and second electric machines and the braking torques of the first and second friction brakes.

11. The vehicle of claim 9, wherein the controller is further programmed to oscillate the braking torques of the first and second friction brakes during the anti-lock braking event.

12. The vehicle of claim 6, wherein the controller is programmed to adjust the regenerative braking torques of the first and second electric machines based on a sliding mode control algorithm.

13. The vehicle of claim 6, wherein the controller is programmed to adjust the regenerative braking torques of the first and second electric machines based on an axle dynamics compensator algorithm that accounts for energy absorbed by the axle during the anti-lock braking event.

14. A vehicle braking control method comprising:
responsive to an anti-lock braking event,
adjusting a regenerative braking torque of an electric machine that is disposed on a wheel axle based on a difference between a desired wheel slip ratio and an actual wheel slip ratio, wherein the regenerative braking torque of the electric machine is adjusted based on a sliding mode control algorithm, and
adjusting a braking torque of a friction brake that is disposed on the wheel axle based on the difference.

15. The method of claim 14, wherein a total braking torque is a sum of the regenerative braking torque of the electric machine and the braking torque of the friction brakes.

16. The method of claim 14, wherein the actual wheel slip ratio is based on a difference between a wheel speed and a vehicle speed.

17. The method of claim 14, wherein the regenerative braking torque of the electric machine is adjusted based on an axle dynamics compensator algorithm that accounts for energy absorbed by a vehicle axle during the anti-lock braking event.

* * * * *